United States Patent [19]

Chuba et al.

[11] Patent Number: 4,849,688
[45] Date of Patent: Jul. 18, 1989

[54] DETECTION OF SINGLE-FREQUENCY SIGNALS

[75] Inventors: Christian J. Chuba, Scotch Plains; Charles R. Walden, Jr., Montclair; Joseph J. Grecco, Saddle Brook; Jeffrey I. Feinstein, Clifton, all of N.J.

[73] Assignee: Dialogic Corporation, Parsippany, N.J.

[21] Appl. No.: 247,049

[22] Filed: Sep. 16, 1988

[51] Int. Cl.$^4$ ............................................. G01R 23/02
[52] U.S. Cl. ................................. 324/78 R; 324/77 R
[58] Field of Search ................. 324/77 R, 77 B, 77 C, 324/77 CS, 78 D, 79 D; 364/484, 485; 328/137, 140

[56] References Cited

U.S. PATENT DOCUMENTS 4,424,482  1/1984  Drogin ............................... 324/77 B

*Primary Examiner*—Michael J. Tokar
*Attorney, Agent, or Firm*—Michael B. Einschlag

[57] ABSTRACT

Apparatus for detecting a single-frequency signal having a predetermined frequency in an analog signal includes means for converting the analog signal to a differentially encoded digital signal and detection means for detecting a single-frequency signal having the predetermined frequency from the differentially encoded digital signal. In a preferred embodiment, the detection means includes: means for detecting one cycle of the analog signal by detecting a signal maximum followed by detecting a signal minimum which is followed, in turn, by detecting another signal maximum; means for determining the length of the cycle, for determining whether the length is within predetermined bounds, and for keeping a count of such occurrences; and means for determining whether the count has reached a predetermined amount, whereby a single-frequency signal having the predetermined frequency has been detected.

11 Claims, 2 Drawing Sheets

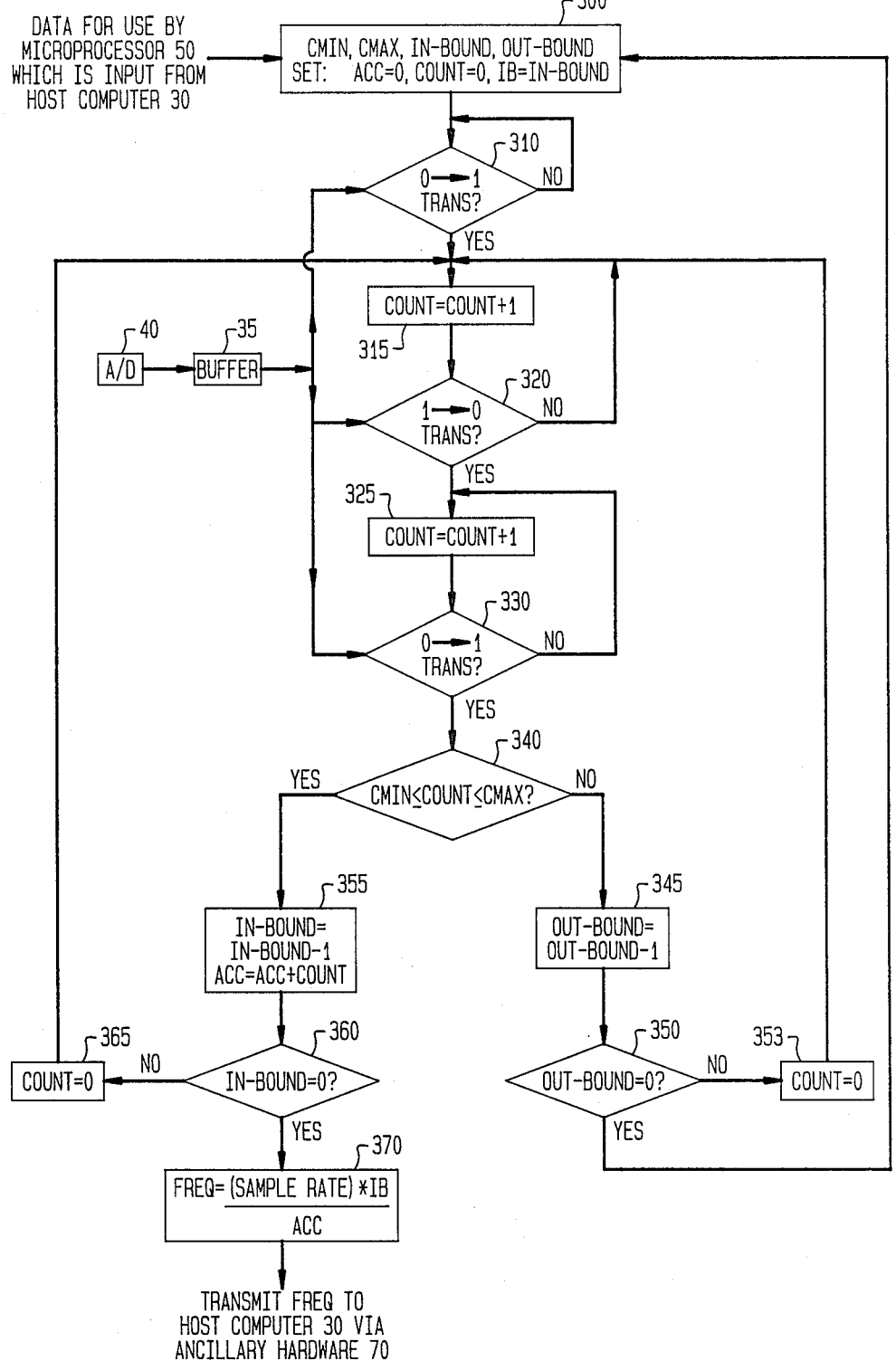

DETECTION OF SINGLE-FREQUENCY SIGNALS

TECHNICAL FIELD OF THE INVENTION

The present invention pertains to apparatus and method for detecting and measuring single-frequency signals and, in particular, to apparatus and method for detecting and measuring single-frequency signals in differentially encoded digital signals.

BACKGROUND OF THE INVENTION

Digital processing of signals in telecommunications applications typically involves analyzing a telephone call to determine its status at various points in time. For example, it is well known to those of ordinary skill in the art that one can determine the status of a telephone call by analyzing call progress milestones such as, for example, busy, call-pickup, operator-intercept and so forth. Further, it is also well known to those of ordinary skill in the art that, under certain conditions, specific single-frequency tones, denoted as "call-progress" tones, are transmitted as analog signals over the telecommunications network to indicate call status. Examples of such "call-progress" tones include, without limitation, SIT tones (system intercept tones), answering machine tones, and so forth. As a result, there is a well recognized need in the telecommunications industry for apparatus which can detect and measure specific analog single-frequency signals, i e., "call-progress" tones, as a means for analyzing and monitoring call status.

In addition to the above, it is well known to those of ordinary skill in the art that processing and storing an analog signal by means of a computerized system typically requires some form of analog-to-digital conversion of the analog signal to a digital representation. Further, one well known method for performing an analog-to-digital conversion uses a linear digital encoding scheme. Although a linear digital encoding scheme provides a digital representation which has a great deal of fidelity, the linearly encoded digital signal often requires an unacceptably large amount of resources for storage. One method for reducing the amount of resources required to store a digital representation of the analog signal which is well known to those of ordinary skill in the art is to use a differential digital encoding scheme to provide the digital signal instead of the linear digital encoding scheme. Differential digital encoding schemes are well known to those of ordinary skill in the art collectively as delta modulation and there are many different forms thereof, such as, for example, DM (delta modulation), ADPCM (adaptive differential pulse code modulation), CVSD (continuously variable slope delta modulation), and so forth.

Because of the need to process analog signals by means of a computerized system, a typical apparatus for use in detecting and monitoring call progress tones in the prior art operates as follows. It detects an analog signal and converts it to digital form: (1) first, by using a differential digital encoding scheme to provide a digital signal which is suitable for efficient storage and (2) second, by using a linear digital encoding scheme to provide a digital signal which is used to detect and measure single-frequency tones. A typical apparatus in the prior art detects and measures single-frequency tones in the linearly encoded digital signal by methods such as, for example, the well known zero-crossing frequency detection method.

As one can readily appreciate from the above, the dual analog-to-digital conversion of analog signals which is typical of prior art apparatus, i.e., a differential digital encoded conversion of the analog signal and a linear digital encoded conversion of the analog signal, is inefficient and results in the need for extra hardware and extra software to achieve the dual conversion. Consequently, there exists a need in the art for apparatus and method for detecting and measuring single-frequency analog signals without the need to perform dual analog-to-digital conversions of the analog signals.

In addition to the above-identified need, there also exists a need in the art for apparatus and method for detecting and measuring single-frequency signals which occur in digitally encoded signals, whether the digital signals be digitally encoded by a differential encoding scheme or a non-differential encoding scheme such as a linear encoding scheme, a u-law encoding scheme, an A-law encoding scheme, a pulse code modulation (PCM) encoding scheme or so forth.

SUMMARY OF THE INVENTION

Embodiments of the present invention advantageously solve one of the above-identified problems in the art by providing apparatus and method for detecting and measuring a single-frequency signal having a predetermined frequency in an analog signal without the need to perform separate, linear encoded analog-to-digital conversions. In particular, such embodiments of the inventive apparatus comprise encoding means for converting the analog signal into a differentially encoded digital signal and detection means for detecting the single-frequency signal having the predetermined frequency in the differentially encoded digital signal.

Further embodiments of the present invention solve another of the above-identified problems in the art by providing apparatus and method for detecting and measuring a single-frequency signal having a predetermined frequency which occurs in a digitally encoded signal, whether the digital signal be digitally encoded by a differential encoding scheme or by a non-differentially encoding scheme such as a linear encoding scheme, a u-law encoding scheme, an A-law encoding scheme, a pulse code modulation (PCM) encoding scheme or so forth. In particular, such embodiments of the inventive apparatus for detecting and measuring a single-frequency signal having the predetermined frequency in a differential digital encoded signal comprises the detection means identified above. Further in particular, such embodiments of the inventive apparatus for detecting and measuring a single-frequency signal having the predetermined frequency in a non-differential digital encoded signal comprises signal processing means for converting the non-differential digital encoded signal to differential digital encoded signal and the detection means identified above.

In preferred embodiments of the present invention, the detection means for detecting single-frequency signals in the differentially encoded digital signal comprises: means for detecting a predetermined number of cycles of the differentially encoded digital signal; means for determining the length of the cycles, for determining whether or not the length is within predetermined bounds and for keeping count of the number of such detected cycles which are within the predetermined bounds and the number of such detected cycles which are outside the predetermined bounds; and means for determining whether the count of detected cycles within predetermined bounds has reached a first predetermined amount, whereby a single-frequency signal having the predetermined frequency has been detected, and for determining whether the count of detected cycles which are outside the predetermined bounds has reached a second predetermined amount, whereby a single-frequency signal having the predetermined frequency has not been detected.

Further in particular, the means for detecting a predetermined number of cycles comprises means for detecting one cycle of the differentially encoded digital signal by detecting a signal maximum followed by detecting a signal minimum which is followed, in turn, by detecting another signal maximum.

Still further in particular, the means for detecting one cycle comprises means for detecting a transition from an ascending signal to a descending signal to indicate a signal maximum and for detecting a transition from a descending signal to an ascending signal to indicate a signal minimum.

BRIEF DESCRIPTION OF THE DRAWING

A complete understanding of the present invention may be gained by considering the following detailed description in conjunction with the accompanying drawing, in which:

FIG. 2 shows a flow chart of a microprocessor program which forms part of the preferred embodiment of the inventive apparatus shown in FIG. 1.

To facilitate understanding, identical reference numerals have been used to denote identical elements common to the figures.

DETAILED DESCRIPTION

Figure 1:
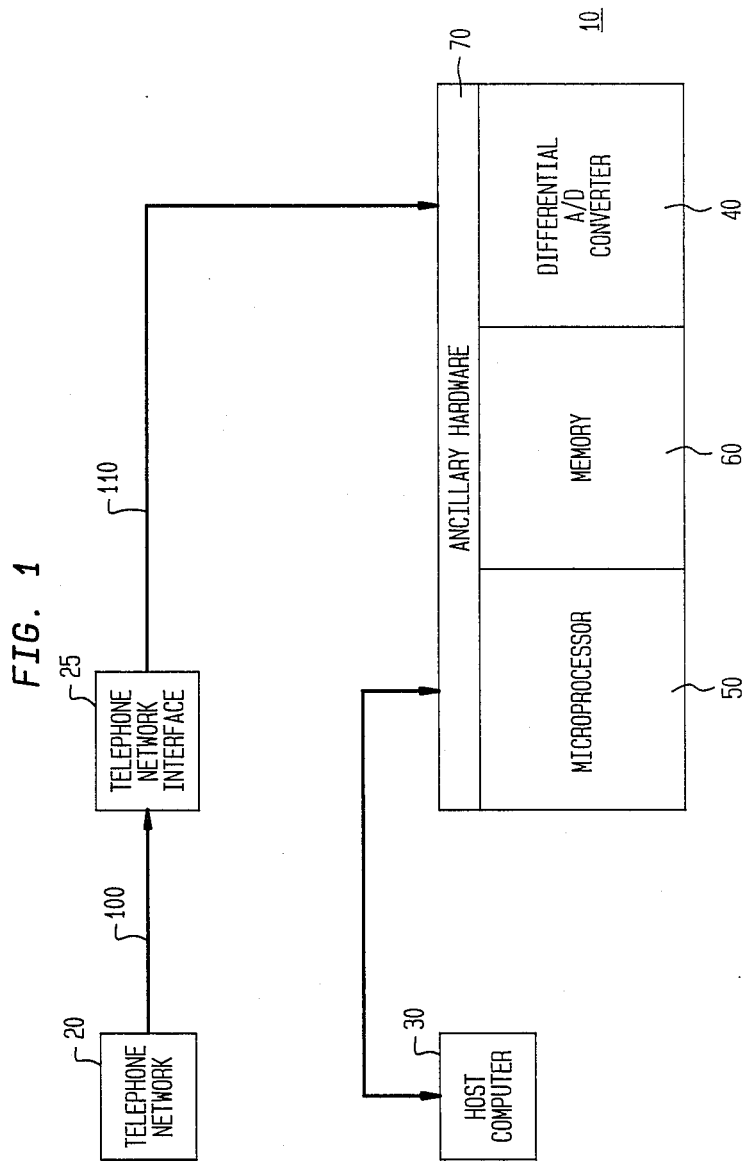
FIG. 1 shows, in pictorial form, a block diagram of a preferred embodiment of the inventive apparatus for detecting and measuring single-frequency signals and of the manner in which the inventive apparatus is used.

FIG. 1 shows a block diagram of a preferred embodiment of inventive apparatus DM 10 and the manner in which it is used for detecting and measuring single-frequency signals. As shown in FIG. 1, telephone signal 100 from telephone network 20 is transmitted by telephone network interface 25 to DM 10 as signal 110. Many apparatus for use as telephone interface 25 are well known to those of ordinary skill in the art. For example, one such apparatus comprises a portion of a DIALOG/41 Digitized Voice and Telephony Computer Interface circuit which is available from Dialogic Corporation, 129 Littleton Road, Parsippany, N.J. 07054. In pertinent part, this circuit comprises well known means for interfacing with the telephone network to send and receive calls; means, such as tranformers, to electrically isolate subsequent circuits; and filter circuits.

Signal 110 which is output from telephone network interface 25 is applied as input to DM10 and, in particular, to ancillary hardware 70. Specifically, signal 110 is applied to a sample and hold circuit (not shown) in ancillary hardware 70, which sample and hold circuits are well known to those of ordinary skill in the art.

The output from the sample and hold circuit contained in ancillary hardware 70 is applied to differential analog-to-digital converter 40. There are many circuits which are well known to those of ordinary skill in the art that can be used as differential analog-to-digital converter 40. For example, differential analog-to-digital converter 40 may be a Motorola MC3518 CVSD encoder which is available from Motorola Semiconductor Products Division of Austin Texas, an Oki Electric MSM5218 ADPCM encoder which is available from Oki Semiconductor of Sunnyvale, California, or any other such equipment. The differentially encoded signal output from differential analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Texas, or any other such equipment.

DM 10 further comprises microprocessor 50, memory 60, and a portion of ancillary hardware 70 for use interfacing with host computer 30. Microprocessor 50 may be any one of a number of microprocessors which are well known to those of ordinary skill in the art such as an INTEL 8086 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordianry skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Texas, or any other such equipment. Finally, as shown in FIG. 1, DM 10 interfaces with host computer 30, which may be any one of a number of computers which are well known to those of ordinary skill in the art such as, for example, an IBM PC/XT/AT, or any other such equipment.

The differentially encoded digital samples output from differential analog-to-digital encoder 40 are placed in the buffer (not shown) and are output, in turn, therefrom to the data bus (not shown). Then, the digital samples are received from the data bus, digital sample by digital sample, by microprocessor 50. Microprocessor 50 analyzes the digital samples for purposes of detecting and measuring single-frequency signals under the direction of a software program which performs in accordance with the flow chart shown in FIG. 2. Microprocessor 50 further communicates with host computer 30 and memory 60 in the manner which is described in further detail below.

Before discussing how microprocessor 50 detects and measures the single-frequency tones in accordance with a preferred embodiment, we will first discuss how microprocessor 50 operates in general to detect a single-frequency signal having a predetermined frequency. Microprocessor 50 detects a predetermined number of cycles of signal 110. Although we will consider the case where microprocessor 50 detects one cycle of signal 110 as a specific example, we note that the invention is not restricted to this case.

For each cycle that microprocessor 50 detects, a determination is made of the length of the cycle, which length corresponds to the frequency of that cycle, those of ordinary skill in the art realizing that frequency is the inverse of cycle. If the length falls within predetermined lower and upper values which correspond to upper and lower frequency values, then a count pertaining to an "acceptable" measurement is incremented. On the other hand, if the frequency falls outside the predetermined lower and upper values, then a count pertaining to an "unacceptable" measurement is incremented. Then again microprocessor 50 returns to detect another cycle of signal 110. If the number of "acceptable" measurements equals a first predetermined number before the number of "unacceptable" measurements reaches a second predetermined number, then DM 10 has detected a single-frequency signal having a frequency which is within a certain range about the predetermined frequency. At this point microprocessor 50 can compute the average frequency of the detected single-frequency tone. However, if the number of "unacceptable" measurements reaches the second predetermined number before the number of "acceptable" measurements reaches the first predetermined number, then DM 10 has not detected the single-frequency signal having the predetermined frequency and it resets the counts and begins its search anew.

A cycle is detected, in a preferred embodiment of the present invention, when microprocessor 50, in examining succesive differentially encoded digital samples, detects a signal maximum followed by a signal minimum which is followed, in turn, by another signal maximum. The length of the cycle is determined by the number of samples which were examined during the abovedescribed detection sequence. In particular, a signal maximum may be detected by a transition from an ascending signal to a descending signal and a signal minimum may be detected by a transition from a descending signal to an ascending signal. Further in particular, a signal maximum can be detected by detecting the change in the sign bit of a digital sample from a plus value to a minus value and a signal minimum can be detected by detecting the change in the sign bit of a digital sample from a minus value to a plus value.

FIG. 2 shows a flow chart of a microprocessor program which forms part of the preferred embodiment of the inventive apparatus shown in FIG. 1. As shown in FIG. 2, there is a first stage, referred to as an initialization stage, which corresponds to the steps carried out in box 300. As indicated by box 300, certain reference values are transmitted to DM 10 from host computer 30 for use in detecting and measuring a single-frequency signal having a predetermined frequency. It should be clear to those of ordinary skill in the art that these reference values need not be supplied by an external host computer in general but may be input to DM 10 in any manner such as by being stored in memory 60 or by being input to DM 10 over the telephone network and so forth.

As shown in FIG. 2, at the start of the detection and measurement procedure, host computer 30 transmits four values, labelled CMIN, CMAX, IN-BOUND, and OUT-BOUND, respectively, through ancillary hardware 70 to microprocessor 50 and to memory 60 for storage. CMIN and CMAX correspond to cycle lengths which represent the upper and lower bounds of an acceptable frequency range for the predetermined frequency signal, respectively, and are determined as follows:

$$CMIN = \frac{\text{rate of digital encoding in samples per second}}{\text{upper frequency bound}}$$

-continued $$CMAX = \frac{\text{rate of digital encoding in samples per second}}{\text{lower frequency bound}}$$

IN-BOUND is the number of "acceptable" frequency measurements, i.e., frequency measurements that are within the acceptable frequency range, that are required to be made before the detection of a single-frequency signal having the predetermined frequency is considered to be valid. OUT-BOUND is the number of "unacceptable" frequency measurements, i.e., frequency measurements that are outside the acceptable frequency range, that are required to be made before it is considered that the desired single-frequency tone has not been detected and that the search must start anew. Microprocessor 50 also stores IN-BOUND in a memory variable IB in memory 60. Finally, as the last step in the initialization procedure set forth in box 300, microprocessor 50 sets two counters in memory 60 to zero. These counters are labelled COUNT and ACC, respectively. As will become clear below, COUNT represents the number of digital samples which have been examined between successive maxima of the input signal of a particular cycle and ACC represents the cumulative total of the number of digital samples between successive maxima for all the cycles which have an "acceptable" frequency. Then the program in microprocessor 50 transfers control to decision box 310.

Decision box 310 represents a point in the program at which microprocessor 50 receives a digitally encoded measurement, also referred to below as a digital sample, from analog-to-digital converter 40, through buffer 35, and examines its sign bit. If the program in microprocessor 50 determines that the sign bit has changed from a 0 to a 1, indicative of a transition from an ascending signal to a descending signal which is, in turn, indicative of a maximum, then the program in microprocessor 50 transfers control to the portion of the program which corresponds to box 315. If there is no such transition, the program in microprocessor 50: (1) saves the present sign bit and (2) retains control at decision box 310 to await receipt of the next digitally encoded measurement, i.e., digital sample, from analog-to-digital converter 40.

Box 315 represents a point in the program at which microprocessor 50 increments COUNT in memory 60 by one and transfers control to decision box 320.

Decision box 320 represents a point in the program at which microprocessor 50 receives a digital encoded measurement from analog-to-digital converter 40, through buffer 35, and examines its sign bit. If the program in microprocessor 50 determines that the sign bit has changed from a 1 to a 0, indicative of a transition from a descending signal to an ascending signal which is, in turn, indicative of a minimum, then the program in microprocessor 50 transfers control to the portion of the program which corresponds to box 325. If there is no such transition, the program in microprocessor 50 saves the present sign bit and transfers control to box 315 to increment COUNT, after which, control is transferred back to decision box 320 to await receipt of the next digitally encoded measurement, i.e., digital sample, from analog-to-digital converter 40.

Box 325 represents a point in the program at which microprocessor 50 increments COUNT in memory 60 by one and transfers control to decision box 330.

Decision box 330 represents a point in the program at which microprocessor 50 receives a digitally encoded measurement from analog-to-digital converter 40, through buffer 35, and examines its sign bit. If the program in microprocessor 50 determines that the sign bit has changed from a 0 to a 1, indicative of a transition from an ascending signal to a descending signal which is, in turn, indicative of a maximum, then the program in microprocessor 50 transfers control to the portion of the program which corresponds to decision box 340. If there is no such transition, the program in microprocessor 50 saves the present sign bit and transfers control to box 325 to increment COUNT, after which, control is transferred back to decision box 330 to await receipt of the next digitally encoded measurement, i.e., digital sample, from analog-to-digital converter 40

Decision box 340 represents a point in the program at which microprocessor 50 has determined that a 0 to 1 transition of the sign bit indicative of a maximum has been followed by a 1 to 0 transition of the sign bit indicative of a minimum, which has been followed, in turn, by a 0 to 1 transition of the sign bit indicative of a maximum, i.e., one cycle of an oscillatory signal has been detected. At decision box 340, the program in microprocessor 50 examines COUNT. At this point, COUNT represents the number of digitally encoded measurements, i.e., digital samples, which have been occurred between the last two maxima of telephone signal 100. If COUNT is anywhere in the range between reference values CMIN and CMAX, then the program in microprocessor 50 deems that the detected cycle is, within bounds of predetermined error, one cycle of the single-frequency signal sought after. As a result, the program in microprocessor 50: (1) decrements IN-BOUND by one and stores it in memory 60 in accordance with box 355; (2) increments ACC by COUNT and stores it in memory 60 in accordance with box 355; and (3) transfers control to the portion of the program which corresponds to decision box 360. On the other hand, if COUNT is either larger than CMAX or smaller than CMIN, the program in microprocessor 50: (1) decrements OUT-BOUND by 1 and stores it in memory 60 in accordance with box 345 and (2) transfers control to the portion of the program which corresponds to decision box 350.

Decision box 350 represents a point in the program at which microprocessor 50 examines the number of out-of-bounds measurements. If the program in microprocessor 50 determines that OUT-BOUND is zero, then the number of allowable out-of-bounds measurements has been exceeded. If this is so, then the program in microprocessor 50 transfers control to the portion of the program which corresponds to box 300 for another initialization, i.e., it has decided that the signal is not the single-frequency signal sought after. If the program in microprocessor 50 determines that OUT-BOUND is not zero, then the program in microprocessor 50: (1) resets COUNT to zero and stores it in memory 60 in accordance with box 353 and (2) transfers control to the portion of the program which corresponds to box 315.

Decision box 360 represents a point in the program at which microprocessor 50 examines the number of in-bounds measurements. If the program in microprocessor 50 determines that IN-BOUND is zero, then the number of in-bound measurements necessary for validation of a particular frequency detection has been made before OUT-BOUND is zero. If this is so, then the program in microprocessor 50 transfers control to the portion of the program which corresponds to box 370 for computation of the average frequency of the detected single-frequency signal. If the program in microprocessor 50 determines that IN-BOUND is not zero, then the program in microprocessor 50: (1) resets COUNT to zero and stores it in memory 60 in accordance with box 365 and (2) transfers control to the portion of the program which corresponds to box 315.

Finally, box 370 represents the point in the program at which microprocessor 50 determines the average frequency of the single-frequency signal it has detected by computing the average frequency of the detected cycles, the frequency of which cycles fell within the predetermined lower and upper limits, according to the following formula:

$$\text{Aver. freq.} = \frac{\text{rate of digital encoding in samples per second}}{(ACC/IB)}$$

Finally, microprocessor 50 transmits this value to host computer 30 using ancillary hardware 70. Microprocessor 50 then waits for further commands.

Note that although the preferred embodiment showed the detection of a cycle of the input signal by detecting a maximum followed by detecting a minimum which was followed, in turn, by detecting another maximum, the present invention is not limited to this detection scheme. For example, the inventive apparatus could function just as well by detecting a minimum followed by detecting a maximum which was followed, in turn, by detecting another minimum. Further, as was discussed above, the present invention is not limited to the detection of one cycle but includes embodiments which detect a multiplicity of cycles.

As should be clear to those of ordinary skill in the art, further embodiments of the present invention may be made without departing from its teachings. For example, (1) an embodiment of the present invention can detect and measure single-frequency signals from a differentially encoded digital signal without having to first convert from analog to digital form and such an embodiments would not include a differential analog-to-digital encoder such as encoder 40—such an embodiment may be used, for example, to detect and measure single-frequency signals in differentially encoded digital signals which have been stored in computer systems; (2) an embodiment of the present invention can detect and measure single-frequency signals from a non-differentially encoded signal such as a linearly encoded digital signal or a digital signal which has been encoded according to a u-law scheme or an A-law scheme and such embodiments comprise a linear-to-differential encoder means and the detection means described above—such linear-to-differential encoder means are well known to those of ordinary skill in the art in the form of commercially available digital signal processors such as the TMS 320 which is available from Texas Instruments of Dallas, Tx.; and (3) although the above-described embodiment was described with respect to the search for a single predetermined frequency, it should be clear to those of ordinary skill in the art that one can search for several predetermined frequencies at the same time by using several sets of in-bounds and out-bounds values in a manner which should be clear to those of ordinary skill in the art.

What is claimed is:

1. Apparatus for detecting a single-frequency signal having a predetermined frequency or range of frequencies in an analog signal, which apparatus comprises:

encoding means, responsive to the analog signal, for converting the analog signal into a differentially encoded digital signal; and detection means, responsive to the differentially encoded digital signal, for detecting the single-frequency signal having the predetermined frequency.

2. Apparatus for detecting a single-frequency signal having a predetermined frequency or range of frequencies in a non-differentially encoded signal, which signal comprises:

converting means, responsive to the non-differentially encoded signal, for converting the non-differentially encoded signal into a differentially encoded digital signal; and detection means, responsive to the differnntially encoded digital signal, for detecting the single-frequency signal having the predetermined frequency.

3. Apparatus for detecting a single-frequency signal having a predetermined frequency or range of frequencies in a differentially encoded signal which comprises:

means, responsive to the differentially encoded signal, for detecting a predetermined number of cycles of the differentially encoded signal;

means for determining the length or the frequency of the cycles, for determining whether or not the length or frequency is within predetermined bounds and for keeping count of the number of such detected cycles which are within the predetermined bounds and the number of such detected cycles which are outside the predetermined bounds;

and means for determining whether the count of detected cycles within predetermined bounds has reached a first predetermined amount, whereby a single-frequency signal having the predetermined frequency has been detected, and for determining whether the count of detected cycles which are outside the predetermined bounds has reached a second predetermined amount, whereby a single-frequency signal having the predetermined frequency has not been detected.

4. The apparatus of claim 3 wherein the means for detecting a predetermined number of cycles comprises means for detecting one cycle of the differentially encoded digital signal by detecting a signal maximum followed by detecting a signal minimum which is followed, in turn, by detecting another signal maximum.

5. The apparatus of claim 4 wherein the means for detecting one cycle comprises means for detecting a transition from an ascending signal to a descending signal to indicate a signal maximum and for detecting a transition from a descending signal to an ascending signal to indicate a signal maximum.

6. The apparatus of claim 3 wherein the means for detecting a predetermined number of cycles comprises means for detecting one cycle of the differentially encoded digital signal by detecting a signal minimum followed by detecting a signal maximum which is followed, in turn, by detecting another signal minimum.

7. The apparatus of claim 5 wherein the means for detecting a transition from an ascending signal to a descending signal comprises means for detecting the change in sign of the digital signal from a plus to a minus and the means for detecting a transition from a descending signal to an ascending signal comprises means for detecting the change in the sign of the digital signal from a minus to a plus.

8. The apparatus of claim 1 wherein the detection means comprises:

means, responsive to the differentially encoded signal, for detecting a predetermined number of cycles of the differentially encoded signal;

means for determining the length or the frequency of the cycles, for determining whether or not the length or frequency is within predetermined bounds and for keeping count of the number of such detected cycles which are within the predetermined bounds and the number of such detected cycles which are outside the predetermined bounds;

and means for determining whether the count of detected cycles within predetermined bounds has reached a first predetermined amount, whereby a predetermined single-frequency signal has been detected, and for determining whether the count of detected cycles which are outside the predetermined bounds has reached a second predetermined amount, whereby a predetermined single-frequency signal has not been detected.

9. The apparatus of claim 2 wherein the detection means comprises:

means, responsive to the differentially encoded signal, for detecting a predetermined number of cycles of the differentially encoded signal;

means for determining the length or the frequency of the cycles, for determining whether or not the length or frequency is within predetermined bounds and for keeping count of the number of such detected cycles which are within the predetermined bounds and the number of such detected cycles which are outside the predetermined bounds;

and means for determining whether the count of detected cycles within predetermined bounds has reached a first predetermined amount, whereby a predetermined single-frequency signal has been detected, and for determining whether the count of detected cycles which are outside the predetermined bounds has reached a second predetermined amount, whereby a predetermined single-frequency signal has not been detected.

10. The apparatus of claim 3 which further comprises:

means for accumulating the sum of the length of the cycles whose length is within the predetermined bounds; and means for determining the average frequency of the detected single-frequency signal in response to the sum of the length of the cycles.

11. Method for detecting a single-frequency signal having a predetermined frequency in a differentially encoded signal comprises the steps of:

detecting a predetermined number of cycles in the differentially encoded signal;

determining the length or the frequency of the cycles;

determining whether the length or frequency is within predetermined bounds;

keeping count of the number of such detected cycles which are within the predetermined bounds and the number of such detected cycles which are outside the predetermined bounds;

and determining whether the count of detected cycles within predetermined bounds has reached a first predetermined amount, whereby a single-frequency signal having the predetermined frequency has been detected and determining whether the count of detected cycles which are outside the predetermined bounds has reached a second predetermined amount, whereby a single-frequency signal having the predetermined frequency has not been detected.

* * * * *